US008523155B2

(12) United States Patent
Kuroda

(10) Patent No.: US 8,523,155 B2
(45) Date of Patent: Sep. 3, 2013

(54) FLUID PASSAGE CONNECTION DEVICE

(75) Inventor: Takayuki Kuroda, Hyogo (JP)

(73) Assignee: Pascal Engineering Corporation, Hyogo (JP)

(*) Notice: Subject to any disclaimer, the term of this patent is extended or adjusted under 35 U.S.C. 154(b) by 354 days.

(21) Appl. No.: 12/735,733

(22) PCT Filed: Feb. 2, 2009

(86) PCT No.: PCT/JP2009/000381
§ 371 (c)(1),
(2), (4) Date: Aug. 12, 2010

(87) PCT Pub. No.: WO2009/104360
PCT Pub. Date: Aug. 27, 2009

(65) Prior Publication Data
US 2010/0308580 A1 Dec. 9, 2010

(30) Foreign Application Priority Data
Feb. 18, 2008 (JP) .................................. 2008-036181

(51) Int. Cl.
*B23Q 3/00* (2006.01)
*F16L 37/36* (2006.01)
*E03B 1/00* (2006.01)

(52) U.S. Cl.
USPC .................... 269/32; 137/614; 137/614.06

(58) Field of Classification Search
USPC .......... 285/420, 83, 102, 125.1, 306; 269/32; 137/614, 614.03, 614.05, 614.06
IPC ....................................................... F16L 37/22
See application file for complete search history.

(56) References Cited

U.S. PATENT DOCUMENTS

| 3,572,216 | A | * | 3/1971 | Seesody ............................ 92/33 |
| 3,976,099 | A | * | 8/1976 | Russell ..................... 137/614.01 |
| 4,009,729 | A | * | 3/1977 | Vik ............................ 137/614.05 |
| 4,612,796 | A | * | 9/1986 | Smyth, Jr. ..................... 72/481.2 |
| 4,615,546 | A | * | 10/1986 | Nash et al. ...................... 285/26 |
| 4,620,695 | A | * | 11/1986 | Vanistendael ................... 269/24 |
| 4,971,107 | A | * | 11/1990 | Yonezawa ................ 137/614.03 |
| 4,989,630 | A | * | 2/1991 | Yonezawa .................... 137/240 |
| 5,662,141 | A | * | 9/1997 | Arosio ..................... 137/614.05 |

(Continued)

FOREIGN PATENT DOCUMENTS

| JP | 61-014008 | 1/1986 |
| JP | 6-1980 | 1/1994 |

(Continued)

*Primary Examiner* — Joseph J Hail
*Assistant Examiner* — Marc Carlson
(74) *Attorney, Agent, or Firm* — Jordan and Hamburg LLP

(57) ABSTRACT

A fluid passage connection device includes a positioning mechanism that incorporates a male coupler attached to a stationary base member and a female coupler attached to a movable member, and that positions the movable member with respect to the base member so that it becomes possible to connect the male and female couplers, and a clamping mechanism that drives the movable member in order to clamp and fix the movable member with respect to the base member by the elastic force of a spring, and that also releases this clamping with the hydraulic pressure of a hydraulic cylinder; and the male coupler has a connection sleeve that is driven to retract by hydraulic pressure and is driven to advance by a spring, with a hydraulic passage being provided that interconnects a hydraulic pressure operation chamber of the connection sleeve and an unclamping hydraulic chamber of the hydraulic cylinder.

8 Claims, 10 Drawing Sheets

(56) References Cited

U.S. PATENT DOCUMENTS

| | | | | |
|---|---|---|---|---|
| 5,707,186 | A | * | 1/1998 | Gobell et al. ............... 409/136 |
| 5,918,633 | A | * | 7/1999 | Zeiber ........................ 137/614 |
| 5,971,382 | A | * | 10/1999 | Scheufler, Jr. ............... 269/47 |
| 6,637,460 | B2 | * | 10/2003 | Haunhorst ............. 137/614.06 |
| 6,644,331 | B2 | * | 11/2003 | Arisato ........................ 137/1 |
| 6,860,290 | B2 | * | 3/2005 | Knuthson ................... 137/594 |
| 7,654,285 | B2 | * | 2/2010 | Stark ..................... 137/614.03 |
| 7,699,359 | B2 | * | 4/2010 | Le Devehat et al. ......... 285/364 |
| 8,087,650 | B2 | * | 1/2012 | Kuroda et al. .............. 269/306 |
| 2003/0066564 | A1 | | 4/2003 | Arisato |
| 2006/0049565 | A1 | * | 3/2006 | Petit et al. ................... 269/32 |
| 2010/0170081 | A1 | * | 7/2010 | Kuroda et al. ................ 29/559 |
| 2011/0241331 | A1 | * | 10/2011 | Arisato ........................ 285/18 |
| 2011/0254265 | A1 | * | 10/2011 | Rusconi ...................... 285/317 |

FOREIGN PATENT DOCUMENTS

| | | | |
|---|---|---|---|
| JP | 8-004968 | | 1/1996 |
| JP | 2003-004191 | | 1/2003 |
| JP | 2003-117748 | | 4/2003 |
| JP | 2007301613 A | * | 11/2007 |

* cited by examiner

FLUID PASSAGE CONNECTION DEVICE

TECHNICAL FIELD

The present invention relates to a fluid passage connection device; and more particularly relates to such a device incorporating a positioning mechanism and a clamping mechanism that position and clamp a movable member to which a second coupler is attached with respect to a base member to which a first coupler is attached, and with which the first and second couplers can be automatically connected and separated by the application of fluid pressure supplied to the clamping mechanism.

BACKGROUND OF THE INVENTION

In, for example, the technical field of machining, it is often the case that a plurality of hydraulic clamp devices are fitted to a work pallet, and, in a state with the work being fixed by these clamp devices, the work is machined by a machining center. Many hydraulic clamp devices are driven to clamp by hydraulic pressure or by the elastic force of a spring, and are unclamped by hydraulic pressure. And there are provided a mechanism for positioning a work pallet to which the hydraulic clamp device is provided with respect to a base member and a clamping mechanism for fixing it there, and a fluid passage connection device that connects and separates a hydraulic passage for hydraulic pressure supplied to and vented from the work pallet.

In Patent Document #1, for a work pallet that can be fitted to or removed from a table of a machining center and for that table, there is disclosed a device provided with a positioning and fixing mechanism that positions and fixes the work pallet with respect to the table, and with a fluid passage connection device that connects a fluid passage. This fluid passage connection device includes a table side female coupler and a pallet side male coupler, and these male and female couplers incorporate valve mechanisms that are closed by springs, so that the pallet side male coupler may be separated from the female coupler while still maintaining a state in which fluid pressure is still remained.

And, in a device for fluid linking device described in Patent Document #2, each one of an almost symmetric pair of couplers incorporates a check valve that includes a steel ball provided at the tip end portion of that coupler, and a spring that biases the check valve to close it; and, when these two couplers contact against one another, the two steel balls shift one another backwards in mutually opposite directions and put the valves to their opened states, so that the fluid passage is put into the communicating state.

Patent Document #1: Japanese Laid-Open Patent Publication 2003-117748

Patent Document #2: Japanese Laid-Open Patent Publication 2003-4191

In such a case in which predetermined numbers of workpieces consisting of plural pairs of two symmetric types are to be machined in order, such as with automobile components or the like, it is not unusual for there to be a requirement for changing the location in which the hydraulic clamp device is positioned on the work pallet, according to the type of the workpiece. In this case, the clamp unit provided on the work pallets is equipped with a clamp device whose position needs to change, so that a mechanism for positioning and fixing the clamp unit on the work pallets, and a fluid passage connection device for supplying hydraulic pressure to the clamp unit, are also provided; and, by relocating this clamp unit, it is anticipated to vary the location in which the clamp device is positioned.

When changing the location of the clamp unit on the work pallet, the position of the clamp unit is changed manually, the clamp unit is fixed by the positioning and fixing mechanism after having been positioned, and then the fluid passage connection device is connected. If at this time, from before the clamp unit is positioned and fixed, the movable connection members of the male and female couplers of the fluid passage connection device are already in the advanced state, then there is a fear that, during relocation of the clamp device, the clamp unit or the like may collide with these movable connection members and cause damage to them.

Moreover, if the fluid passage connection device described in Patent Documents #1 or #2 is employed, then, when connecting the male and female couplers, it is necessary to press the male and female couplers together in the direction to approach one another with a strong force against the elastic force of the springs in the valve mechanisms that bias their valve members, and against the resistance of the fluid pressure enclosed in the clamp device which acts on the valve members; and this task of connection necessitates a considerable amount of labor and time. In this case it is easy for the clamp unit to be affected by its own weight, since the male and female couplers are connected by the weight of the clamp unit itself and by manual pressure, and it is difficult to enhance the freedom in design.

Moreover, when relocating the clamp unit after use, there is a danger that damage may be caused to either or both of the male and female couplers during separation of the male and female couplers, if the male and female couplers do not separate perfectly when the positioning of the clamp unit is released, or when the fixing by the fixing means is released.

Objects of the present invention are: to provide a fluid passage connection device with which there is no fear of damage to a male coupler or to a female coupler; to provide a fluid passage connection device which is capable of reliably and smoothly connecting the male coupler and the female coupler; and to provide a fluid passage connection device which is capable of automatically connecting the male coupler and the female coupler.

The fluid passage connection device according to the present invention comprises a first coupler fitted to a stationary base member and a second coupler that can be connected to the first coupler and that is fitted to a movable member, constituted so as to connect and separate a fluid passage through the first coupler and the second coupler, and is characterized by comprising: a positioning mechanism for positioning the movable member with respect to the base member, so that it becomes possible for the first coupler and the second coupler to connect together; and a clamping mechanism that clamps the movable member with respect to the base member with an elastic force of an elastic member or an enclosed compressed gas, and that releases this clamping with a fluid pressure of a fluid pressure cylinder; and in that: the first coupler comprises a connection member that is provided so as to be shiftable in its axial direction and connects a fluid passage in an engaged state with the second coupler, a spring that elastically biases the connection member so as to project, and a fluid pressure operation chamber that applies a fluid pressure to drive the connection member so as to retract; and a fluid passage is provided in the base member, making an unclamping fluid chamber of the fluid pressure cylinder communicate with the fluid pressure operation chamber.

When the first coupler and the second coupler are to be connected together, the movable member is positioned with respect to the base member by the positioning mechanism, and then the movable member is fixed with respect to the base member by the clamping mechanism. The clamping mechanism is driven for clamping by the elastic force of the elastic member or the enclosed compressed gas, and its clamping is released by the fluid pressure in the fluid pressure cylinder. The first coupler, which is fitted to the base member, comprises the connection member that is provided so as to be shiftable in its axial direction and connects the fluid passage in an engaged state with the second coupler, the spring that elastically biases the connection member in its direction to project, and the fluid pressure operation chamber that applies a fluid pressure to drive the connection member in its direction to retract.

Since the fluid passage is provided that makes the unclamping fluid chamber of the fluid pressure cylinder communicate with the fluid pressure operation chamber, accordingly, when the clamping of the clamping mechanism is to be released, and when hydraulic pressure is supplied to the fluid passage, initially the connection member shifts to retract so that the first and second couplers are separated, and thereafter the clamping mechanism releases its clamping after the fluid pressure has sufficiently risen.

When the clamping mechanism is to be put into the clamped state, when the fluid pressure in the fluid passage is vented, since the elastic force of the clamping mechanism is a strong force, initially the clamping mechanism goes into its clamped state, and thereafter, after the fluid pressure in the fluid pressure operation chamber has sufficiently decreased, the connection member shifts in its projection direction due to the elastic force of the spring, and the male and female couplers go into the connected state.

SUMMARY OF THE INVENTION

According to the fluid passage connection device of the present invention, since the first coupler which is fitted to the base member comprises the connection member that is provided so as to be shiftable in its axial direction and that connects the fluid passage in an engaged state with the second coupler, the spring that elastically biases the connection member in its direction to project, and the fluid pressure operation chamber that applies a fluid pressure to drive the connection member in its direction to retract, and since the fluid passage is provided that makes the unclamping fluid chamber of the fluid pressure cylinder of the clamping mechanism communicate with the fluid pressure operation chamber, accordingly, when the clamped state of the clamping mechanism is to be released, when fluid pressure is supplied to the fluid passage, initially the connection member shifts to retract and the first and second couplers are automatically separated, and thereafter, after the fluid pressure has risen sufficiently, the clamping mechanism goes into its unclamped state. Due to this, it is possible to separate the first and second couplers automatically and reliably and smoothly, and it is possible reliably to prevent damage to the first and second couplers during the unclamping procedure.

And when the hydraulic pressure in the fluid passage is vented in order to put the clamping mechanism into its clamped state, since the elastic force of the clamping mechanism is a strong force, initially the clamping mechanism goes into its clamped state, and thereafter the connection member automatically shifts in its projection direction due to the elastic force of the spring, and the first and second couplers go into their connected state. Due to this, it is possible to connect the first and second couplers automatically and reliably and smoothly, and it is possible reliably to prevent damage to the first coupler during the clamping procedure.

And furthermore, since the positioning mechanism is provided, and since the first and second couplers are only connected together after the movable member has been accurately positioned with respect to the base member, accordingly it is possible to enhance the durability of the first and second couplers. Furthermore, since the clamping mechanism is provided that fixes the movable member with respect to the base member, accordingly it is also possible to clamp the movable member automatically with respect to the base member, and to unclamp it.

In addition to the structure of the present invention as described above, it would also be acceptable to arrange to employ various further structures, as follows.

(1) When the clamping mechanism is in its unclamped state, fluid pressure may be charged into the fluid pressure operation chamber of the first coupler, and thereby the connection member may be maintained in its retracted position. According to this structure, it is possible to anticipate prevention of damage to the connection member.

The male coupler 81 comprises a case 83 that is fixed in an installation hole in the pallet main body 1 by being screwed thereinto, a connection sleeve 84 that is installed in the case 83 so as to be capable of being raised and lowered along its axial direction, two compression springs 85 that elastically bias the connection sleeve 84 upwards, a movable valve member 86 that is installed in the upper half portion of the connection sleeve 84 so as to be capable of being raised and lowered, a guidance member 84 that is fixed in the connection sleeve 84 and guides the movable valve member 86, and a compression spring 88 that elastically biases the movable valve member 86 upwards. This connection sleeve 84 corresponds to the "connection member" in the claims.

(3) When fluid pressure is supplied to the unclamping fluid chamber in order to change over the clamping mechanism from its clamped state to its unclamped state, the unclamped state may be established after the connection member has been changed over to its retracted position by the fluid pressure in the fluid pressure operation chamber. According to this structure, it is possible to anticipate prevention of damage to the connection member during unclamping.

(4) The spring that elastically biases the connection member may be a spring that generates an elastic force weaker than an elastic force of the elastic member or the enclosed compressed gas for clamping. According to this structure, when changing over the clamping mechanism to its unclamped state, the clamping mechanism changes to its unclamped state after, initially from the low fluid pressure stage, the connection member has shifted to its retracted position and the first and second couplers have separated. Thus, during unclamping, it is possible to anticipate prevention of damage to the first and second couplers.

(5) An air nozzle for detecting seating and a fluid pressure type clamp device may be provided to the movable member; and, as the fluid passage that is connected and separated, there may be provided two fluid pressure passages of two systems for the fluid pressure type clamp devices, and one air passage of one system for an air nozzle. According to this structure, by providing these three passage connection devices, it is possible to connect and to separate the two hydraulic conduits of the two systems and also the air passage of the one system.

DESCRIPTION OF NUMERALS

Figure 1:
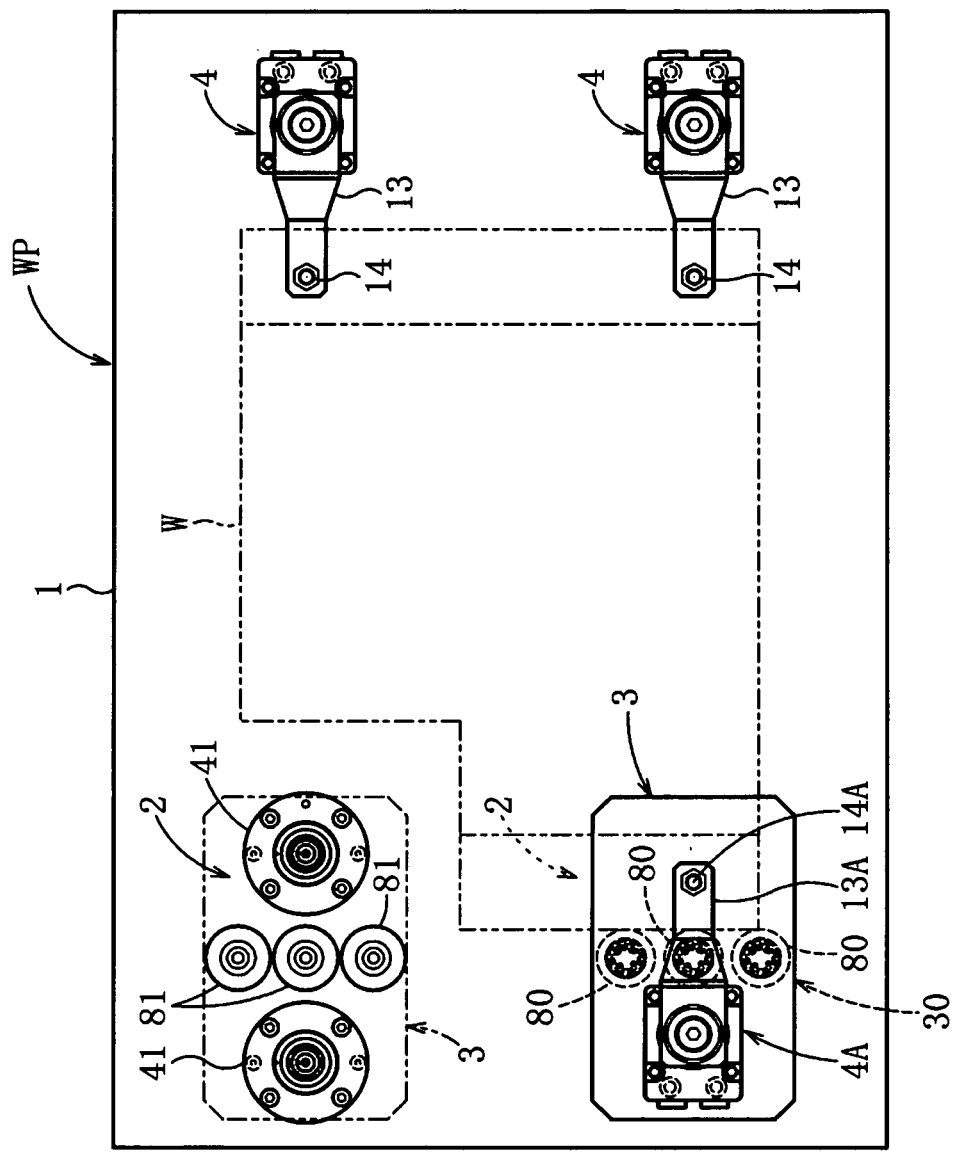
FIG. 1 is a plan view of a work pallet according to an embodiment of the present invention.

1: pallet main body (base member)
3: clamp unit
5a: air nozzle
20: base plate
30: fluid passage connection device
40: positioning mechanism
60, 60A: clamping mechanisms
61: hydraulic cylinder
61a: unclamping hydraulic chamber
64: coned disk spring (spring for clamping)
65: hydraulic passage
80, 80B: coupler mechanisms
81, 82B: male couplers
82, 81B: female couplers
84, 111: connection sleeves
85: spring
89, 119: hydraulic pressure operation chambers
90: hydraulic passage

DESCRIPTION OF THE PREFERRED EMBODIMENTS

In the following, best modes for implementation of the "fluid passage connection device" according to the present invention will be explained on the basis of embodiments.

Embodiment 1

As shown in FIGS. 1 through 5, a work pallet WP is a device that is loaded onto a machining center in a state in which a workpiece W is fixed thereto by a plurality of clamp devices 4 and by a clamp device 4A of a clamp unit 3, for supplying the workpiece W to a machining process.

The work pallet WP comprises a pallet main body 1, two clamp fixing zones 2 provided at the left side portion in FIG. 1 of the pallet main body 1, a clamp unit 3 that is installed to one of these clamp fixing zones 2, two clamp devices 4 fixedly provided at the right side portion in FIG. 1 of the pallet main body 1, and two workpiece support members 5 that correspond to the two clamp devices 4.

Figure 2:
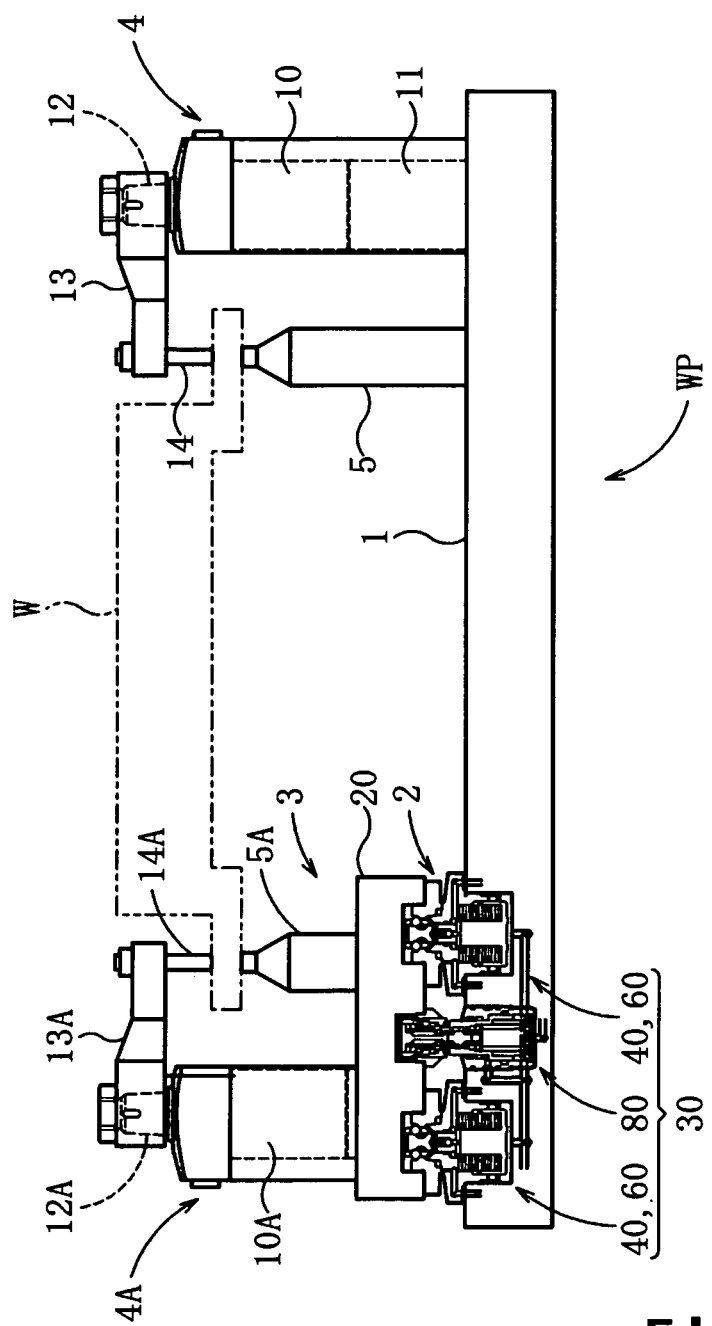
FIG. 2 is an elevation view of the work pallet of FIG. 1.
Figure 3:
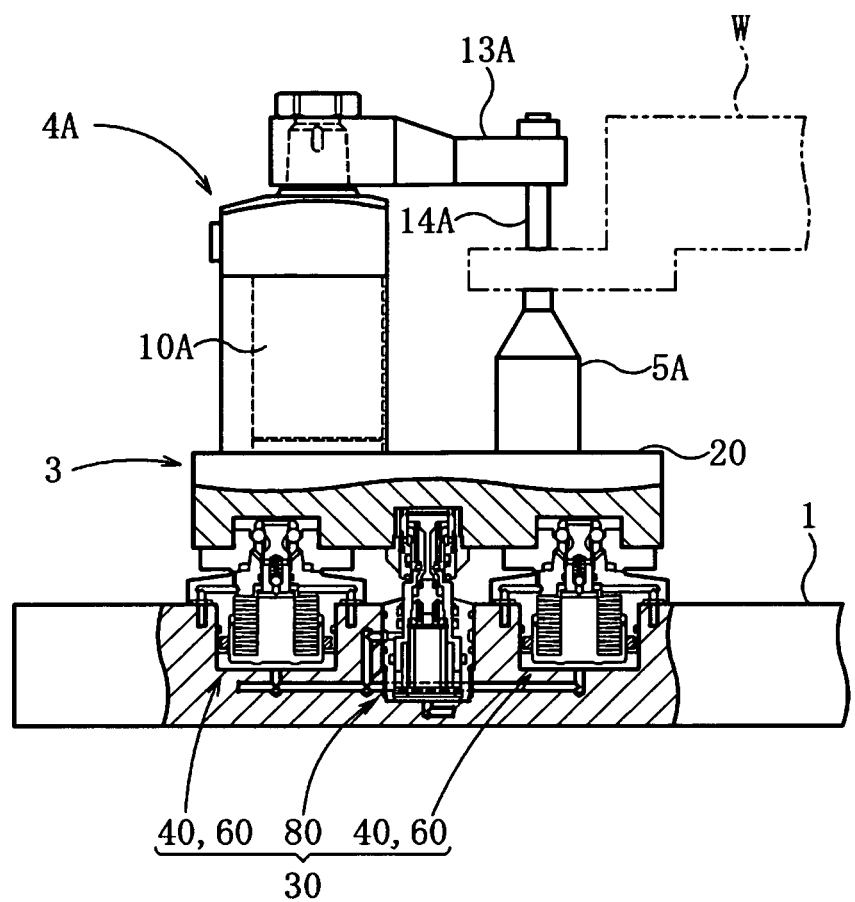
FIG. 3 is a partially cut away vertical sectional elevation view of a clamp unit and a fluid passage connection device.
Figure 4:
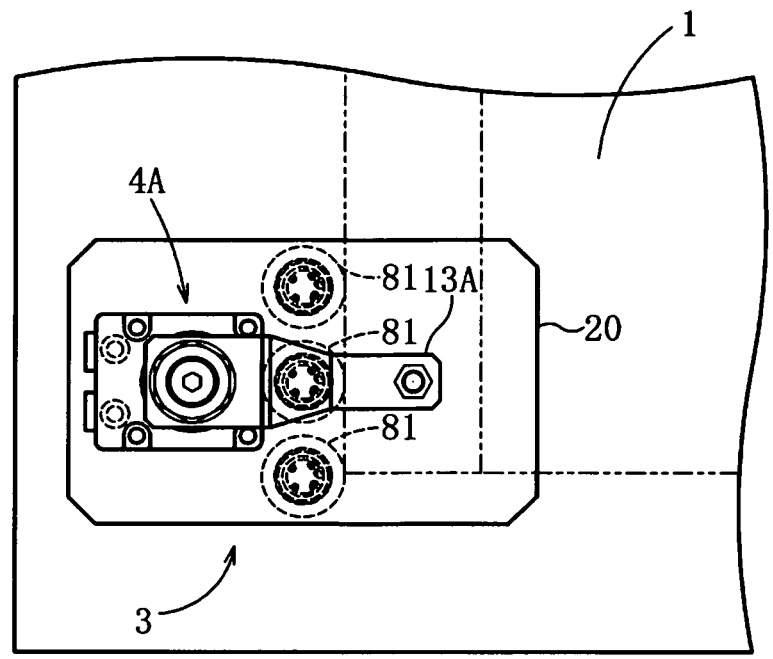
FIG. 4 is a plan view of the clamp unit (clamped state)
Figure 5:
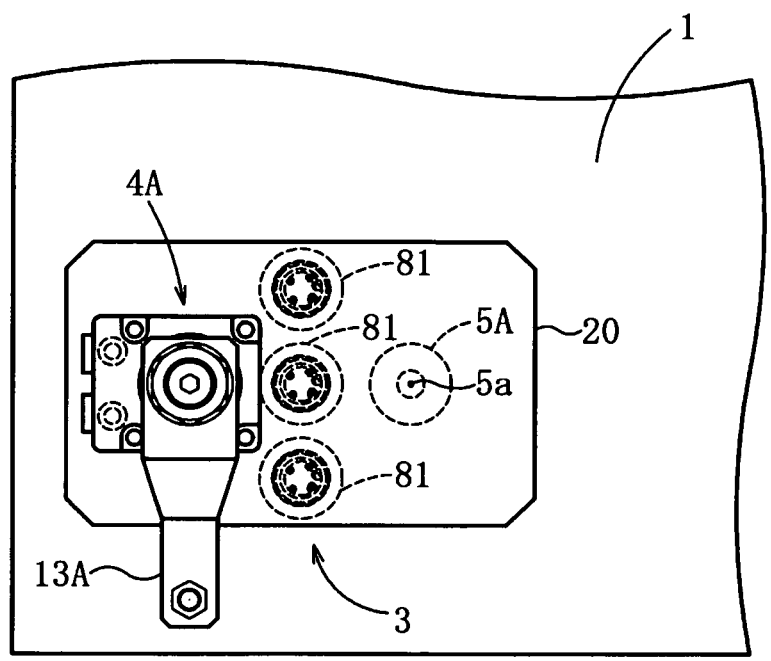
FIG. 5 is a plan view of the clamp unit (unclamped state)
Figure 6:
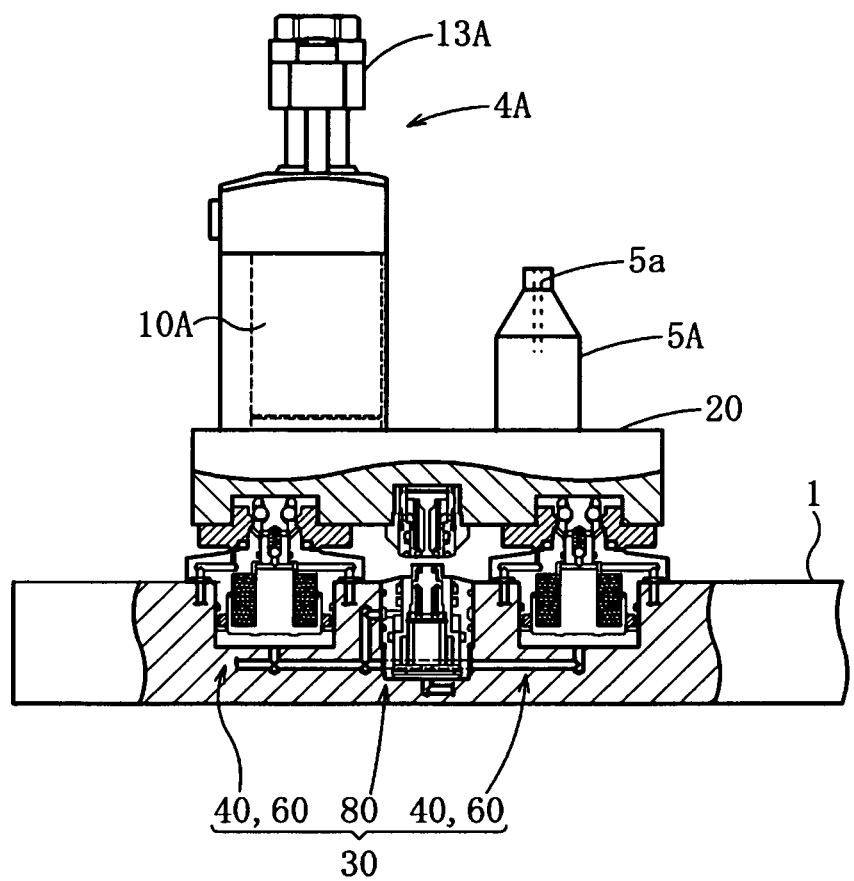
FIG. 6 is a partially cut away vertical sectional elevation view of a clamp unit and a fluid passage connection device.

While a first workpiece W is shown in FIGS. 1 and 2, if a second workpiece that is different from this first workpiece W is to be mounted instead of this first workpiece W, then the clamp unit 3 is installed to the clamp fixing zone 2 at the upper left of FIG. 1.

As shown in FIGS. 1 and 2, each of the clamp devices 4 comprises a clamp main body 10, a spacer block 11, a clamp arm 13 that is fitted at the upper end of an output shaft 12, and a bolt member 14 that is attached at the tip end portion of the clamp arm 13. The clamp main body 10 is fixed to the pallet main body 1 via the spacer block 11. And the clamp main body 10 is a known turn type (twist type) clamp device that incorporates a hydraulic cylinder comprising a clamping hydraulic chamber that drives the output shaft 12 downwards for clamping and an unclamping hydraulic chamber that drives the output shaft 12 upwards for unclamping, and a turning mechanism (twisting mechanism) that causes the output shaft 12 to turn through, for example, 90. degree. in the clockwise direction when the output shaft 12 shifts from the clamp position to the unclamp position, and so on.

An air nozzle for detecting seating of the workpiece W is provided at a central portion of the workpiece support member 5. Hydraulic passages for supplying and venting hydraulic pressure to and from the hydraulic cylinder of the clamp device 4 and an air passage for supplying pressurized air to the air nozzle are formed in the interior of the pallet main body 1, and are connected as appropriate to an external hydraulic pressure supply source and to an external air pressure supply source. The clamp device 4 described above is only one example; instead of this clamp device 4, it would be possible to apply various types of clamp device that are capable of fixing a workpiece W.

As shown in FIGS. 1 through 6, the clamp unit 3 comprises a base plate 20 made of a thick plate, the clamp device 4A and a workpiece support member 5A that are fitted to the upper surface of this base plate 20, and a fluid passage connection device 30 that includes the above clamp fixing zone 2 and is provided to the pallet main body 1 and to the base plate 20. An air nozzle 5a for detecting seating of the workpiece W is provided at a center portion of the workpiece support member 5A. It should be understood that the base plate 20 corresponds to the "movable member", while the pallet main body 1 corresponds to the "base member" in the claims.

The clamp device 4A comprises a clamp main body 10A, a clamp arm 13A that is fitted to the upper end of an output shaft 12A, and a bolt member 14A that is attached at the tip end portion of the clamp arm 13A. This clamp main body 10A is fixed to the base plate 20. This clamp main body 10A is a known turn type (twist type) clamp device that incorporates a hydraulic cylinder comprising a clamping hydraulic chamber for driving the output shaft 12A downwards to clamp the workpiece W and an unclamping hydraulic chamber for driving the output shaft 12A upwards to unclamp the workpiece W, and a turning mechanism that causes the output shaft 12A to turn through, for example, 90° in the clockwise direction when the output shaft 12A shifts from the clamp position (refer to FIG. 4) to the unclamp position (refer to FIG. 5), and so on. However, the hydraulic clamp device 4A described above is only one example; instead of this clamp device 4A, it would be possible to apply various types of clamp device that are capable of fixing a workpiece W.

Figure 7:
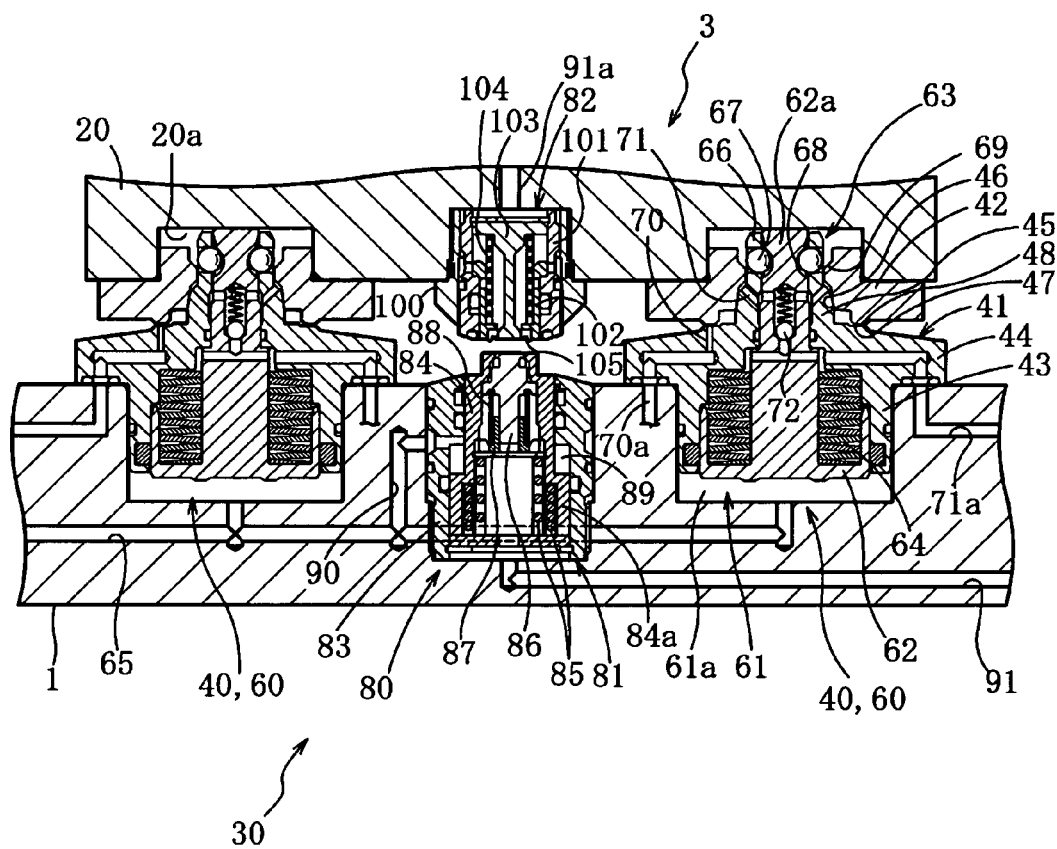
FIG. 7 is a vertical sectional view of the fluid passage connection device (unclamped state, and coupler separated state)
Figure 8:
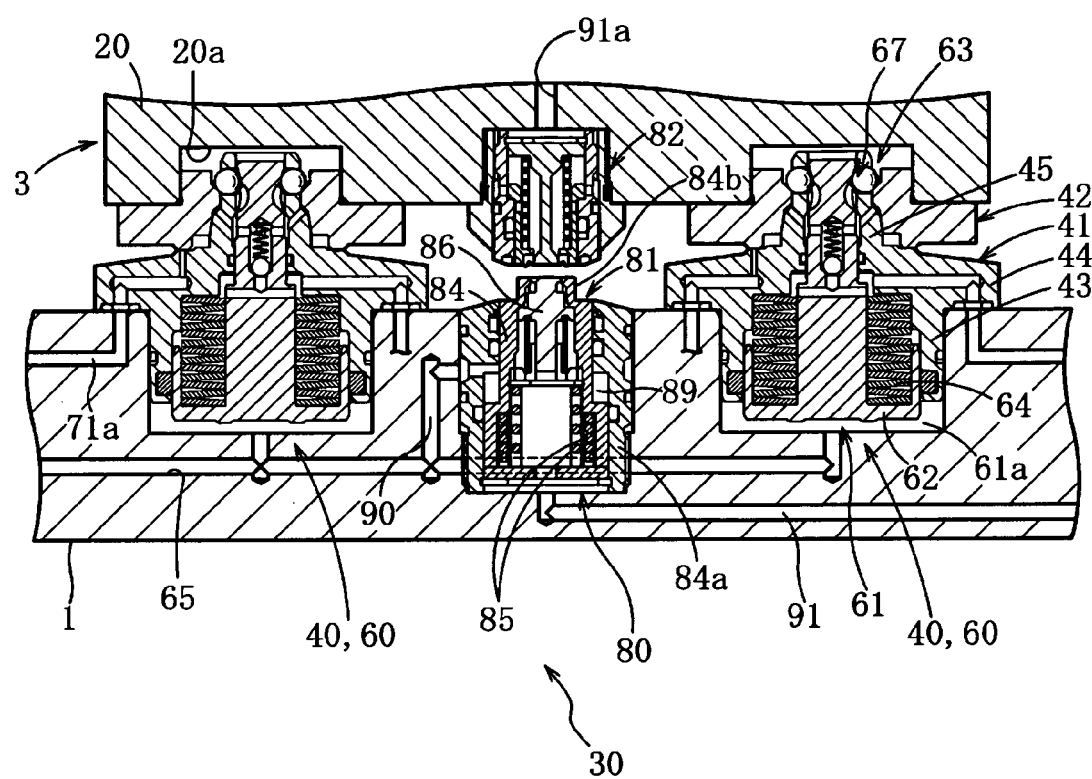
FIG. 8 is a vertical sectional view of the fluid passage connection device (clamped state, and coupler separated state)
Figure 9:
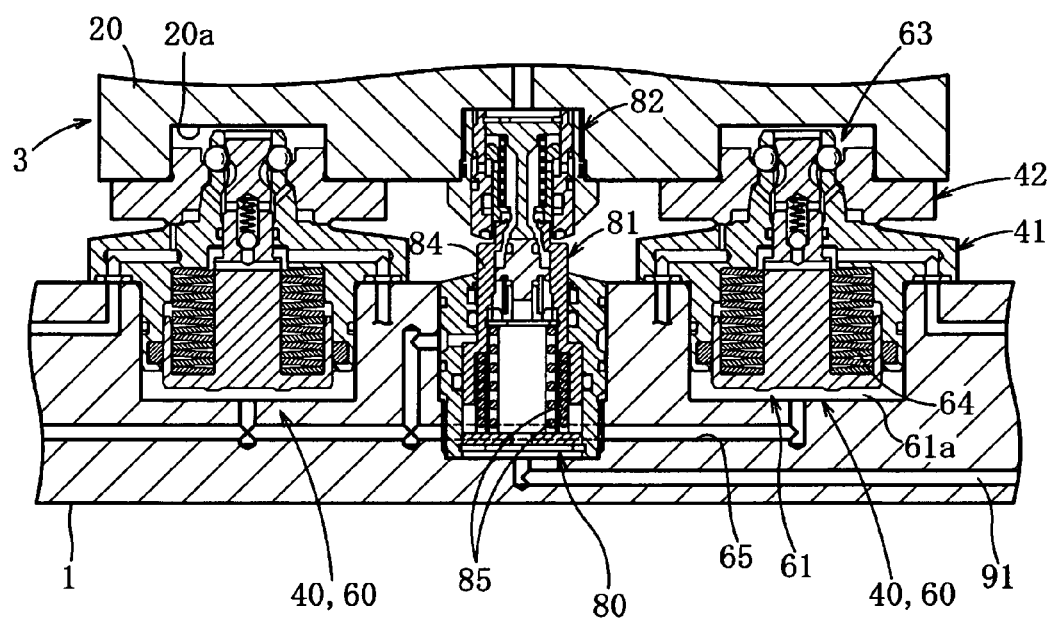
FIG. 9 is a vertical sectional view of the fluid passage connection device (clamped state, and coupler connected state)

As shown in FIGS. 7 through 9, the above fluid passage connection device 30 comprises a pair of positioning mechanisms 40 that position the base plate 20 with respect to the pallet main body 1, a pair of clamping mechanisms 60 that fix the base plate 20 with respect to the pallet main body 1 in an attachable and detachable manner, and three coupler mechanisms 80.

Next, these positioning mechanisms 40 will be explained.

As shown in FIGS. 1 through 9, the pair of positioning mechanisms 40 are arranged on opposite sides of the three coupler mechanisms 80, and these positioning mechanisms 40 have the same structure; accordingly, just one of these positioning mechanisms 40 will be explained.

As shown in FIGS. 7 through 9, the positioning mechanism 40 comprises a support base 41 that is installed on the pallet main body 1, and a locator ring 42 that is fixed to the lower surface of the base plate 20.

The support base 41 comprises a tubular portion 43 that is fitted into a fitting aperture of the pallet main body 1, a circular plate portion 44 that extends at the upper end of the tubular portion 43 and is contacted against and fixed to the upper surface of the pallet main body 1, a tapered barrel portion 45 that extends upwards from the center portion of the circular plate portion 44, a tapered inner circumferential surface 46 that is formed on the inner circumferential surface of the central hole of the locator ring 42, an annular lower end reference surface 47 that is formed at the lower end of the locator ring 42, and a Z direction reference surface 48 formed at the upper surface of the circular plate portion 44 that receives and stops the lower end reference surface 47.

The outer circumferential surface of the tapered barrel portion 45 is formed as a tapered outer circumferential surface with the diameter reducing upwards, and the tapered inner circumferential surface 46 is formed so as to be capable of fitting closely over the tapered outer circumferential surface of the tapered barrel portion 45. And, in a state in which the lower end reference surface 47 is closely contacted against the Z direction reference surface 48, the tapered inner circumferential surface 46 is contacted closely against the tapered outer circumferential surface of the tapered barrel portion 45. It should be understood that the tapered inner circumferential surface 46 contacts closely against the tapered outer circumferential surface of the tapered barrel portion 45, via minute elastic deformation of the tapered barrel portion 45 in the direction to reduce its diameter. Due to this, it is possible to position the locator ring 42 with respect to the support base 41 in the horizontal direction and in the vertical direction with high accuracy.

Next, the clamping mechanisms 60 will be explained.

As shown in FIGS. 7 through 9, the clamping mechanism 60 comprises a hydraulic cylinder 61 that is formed in the interior of the support base 41, a piston member 62 thereof, and a ball lock mechanism 63.

The piston member 62 is fitted in a cylinder bore, and a plurality of laminated coned disk springs 64 are fitted in an annular spring holding chamber, and drive the piston member 62 downwards for clamping. An unclamping hydraulic chamber 61a is defined at the lower side of the piston member 62, and a hydraulic passage 65 is formed in the pallet main body 1 for supplying and venting hydraulic pressure to and from this unclamping hydraulic chamber 61a, with this hydraulic passage 65 being connected to a hydraulic pressure supply source not shown in the figures. Additionally, "hydraulic pressure" means pressurized oil in this specification.

The ball lock mechanism 63 comprises a plurality of steel balls 67 that are installed into a plurality of containing apertures in a cylinder portion 66 that extends upwards from the upper end of the tapered barrel portion 45 and that are movable in the radial direction, a plurality of concave portions 68 that are formed on an external circumferential portion of a portion of a piston rod 62a of the piston member 62 that is near its upper end, and an annular engagement portion 69 consisting of a tapered surface formed on an internal circumferential portion of an upper portion of the central hole of the locator ring 42. These concave portions 68 include sloping concave portions for driving the steel balls 67 outwards in the radial direction, and concave retraction portions for allowing the steel balls 67 partially to retract inwards in the radial direction.

The clamping mechanism 60 shown in FIG. 7 is shown in its unclamped state, and the steel balls 67 are partially retracted into the concave retraction portions, and do not project to the exterior of the outer circumferential surface of the cylinder portion 66. In this unclamped state, it is possible for the base plate 20 to be shifted upwards. And the clamping mechanisms 60 shown in FIGS. 8 and 9 are shown in their clamped state, and the steel balls 67 are driven by the sloping concave portions outwards in the radial direction, and are pressed and clamped against the annular engagement portion 69. It should be understood that, instead of the annular engagement portion 69, it would also be acceptable to arrange to form a concave groove that corresponds to the each of steel balls 67.

In order to blow away cutting chips adhering to the lower end reference surface 47, to the Z direction reference surface 48, to the tapered inner circumferential surface 46, and to the tapered outer circumferential surface of the tapered barrel portion 45 with pressurized air, a plurality of air nozzles 70 and a plurality of air nozzles 71 are formed, and pressurized air can be supplied from an air passage 70a to this plurality of air nozzles 70. Moreover, pressurized air can be supplied via an air passage 71a and a check valve 2 to the plurality of air nozzles 71.

Next, the coupler mechanisms 80 will be explained.

As shown in FIGS. 7 through 9, among the three coupler mechanisms 80, two of the coupler mechanisms 80 are mechanisms that connect and separate hydraulic passages of two systems by which the clamping hydraulic chamber and the unclamping hydraulic chamber of the clamp device 4A are supplied and vented. The other remaining coupler mechanism 80 is a mechanism that connects and separates an air passage by which pressurized air is supplied to the air nozzle 5a of the workpiece support member 5A. Since these three coupler mechanisms 80 are mutually similar, only one of these coupler mechanisms 80 will be explained.

As shown in FIGS. 7 through 9, this coupler mechanism 80 comprises a male coupler that is provided to the pallet main body 1 and a female coupler 82 that is provided to the base plate 20. This male coupler 81 corresponds to the "first coupler", and the female coupler 82 corresponds to the "second coupler" in the claims.

The male coupler 81 comprises a case 83 that is fixed in an installation hole in the pallet main body 1 by being screwed thereinto, a connection sleeve 84 that is installed in the case 83 so as to be capable of being raised and lowered along its axial direction, two compression springs 85 that elastically bias the connection sleeve 84 upwards, a movable valve member 86 that is installed in the upper half portion of the connection sleeve 84 so as to be capable of being raised and lowered, a guidance member 84 that is fixed in the connection sleeve 84 and guides the movable valve member 86, and a compression spring 88 that elastically biases the movable valve member 87 upwards. This connection sleeve 84 corresponds to the "connection member" in the claims.

The lower portion of the connection sleeve 84 is formed as a piston portion 84a having somewhat larger diameter, so that an annular hydraulic pressure chamber 89 that applies hydraulic pressure to the piston portion 84a is defined, with this hydraulic pressure operation chamber 89 being connected to the hydraulic passage 65 via a hydraulic passage 90. As shown in FIG. 7, in the state in which hydraulic pressure in the hydraulic pressure operation chamber 89 is operating, the connection sleeve 84 is in the lowered state as shown in the figure; and, when the hydraulic pressure in the hydraulic pressure operation chamber 89 is vented, the connection sleeve 84 is raised by the biasing force of the spring 85, and is caused to project as shown in FIG. 9. A fluid passage 91 (a hydraulic passage or an air passage) is formed in the pallet main body 1, and this fluid passage 91 is connected to a passage in the male coupler 81, so as to constitute a fluid passage 91a to the base plate 20. A connecting barrel portion 84b is formed at the upper end portion of the connection sleeve 84, and is inserted into the female coupler 82 and connected thereto. Moreover, a plurality of slits are formed upon the external circumferential portion of a guard portion of the movable valve member 86, in order to allow the passage of fluid.

As shown in FIGS. 7 through 9, the female coupler 82 comprises a case 100 that is fixed into an installation hole in the base plate 20 by being screwed thereinto, a barrel member 101 that is fitted into the case 100 and fixed therein, a movable barrel 102 that is installed in the barrel member 101 and is capable of being raised and lowered, a fixed valve member 103 that is fixed in the barrel member 101, and a compression spring 104 that is installed between the fixed valve member 103 and the movable barrel 102 and elastically biases the movable barrel 102 downwards. When the coupler mechanism 80 is in its separated state, as shown in FIG. 7, the movable barrel 102 drops to its lower limit position, and the fluid passage is closed by the fixed valve member 103 and by a seal member 105 that is provided to the movable barrel 102.

As shown in FIG. 9, when the connection sleeve 84 of the male coupler 81 is in its raised position (i.e. in the projecting state), and the connecting barrel portion 84b of the connection sleeve 84 is inserted into the female coupler 82, along with the movable barrel 102 rising and the valve portion of the female coupler 82 opening, also the valve portion of the male coupler 81 opens, so that the fluid passage within the male coupler 81 and the fluid passage within the female coupler 82 are connected together.

The operation and the advantages of the fluid passage connection device 30 described above will now be explained.

When a first workpiece W is fixed, the clamp unit 3 is used in its state in which it is fixed as shown in FIG. 1. By way of example, a case will be explained in which, after a first machining process on the first workpiece W has been completed, in order to fix a second workpiece, the clamp unit 3 is to be attached at the position at the upper left, as shown by the chain line in the figure. First, the pair of clamping mechanisms 60 are in their clamped states due to the elastic force of the coned disk springs 64, and the hydraulic pressures in their unclamping hydraulic chambers 61a are vented, as shown in FIG. 9.

Initially, the fluid supplied to the fluid passage 91 is vented, so that it is ensured that the fluid does not leak out, even if each of the three coupler mechanisms 80 is separated. Next, when the hydraulic pressure supply source is operated and hydraulic pressure is supplied to the hydraulic passage 65 in order to bring the clamping mechanisms 60 from their clamped states (refer to FIG. 9) to their unclamped states (refer to FIG. 7), hydraulic pressure is supplied to the unclamping hydraulic chambers 61a and to the hydraulic pressure operation chambers 89, and the connection sleeves 84 are changed over to their retracted positions due to the hydraulic pressure in the hydraulic pressure operation chambers 89, so that thereafter the mechanisms 60 go into their unclamped states.

When these unclamped states are established, the piston members 62 are elevated, the steel balls 67 are partially retracted into the concave portions 68 and are pulled inwards further than the outer circumferential surface of the cylinder portions 66, and the close mutual engagements of the tapered outer circumferential surfaces of the tapered barrel portions 45 and the tapered inner circumferential surfaces 46 are separated (refer to FIG. 7) by the wall surfaces of the concave apertures 20a of the base plate 20 being pressed with the ends of the piston members 62.

And, since the springs 85 elastically biasing the connection sleeves 84 are springs that are remarkably weaker than the coned disk springs 64 for clamp driving, accordingly, at a time point partway through the rising of the pressure of hydraulic pressures in the hydraulic passages 65, the connection sleeves 84 change over to their lowered retracted positions (refer to FIG. 8), and thereafter the clamping mechanisms 60 go into their unclamped states (refer to FIG. 7). And, while the clamping mechanisms 60 are in their unclamped states, hydraulic pressure is supplied to the hydraulic pressure operation chambers 89 of the male couplers 81, so that the connection sleeves 84 are maintained in their retracted positions.

Next, while the clamp unit 3 is moved to the clamp fixing zone 2 at the upper left of FIG. 1, hydraulic pressure is supplied to the hydraulic passage 65, the hydraulic chambers 61a, and the hydraulic pressure operation chambers 89 of this clamp fixing unit 3 as well. Due to this, the piston members 62 of the clamping mechanisms 60 are brought to their unclamped positions, and the connection sleeves 84 are in their retracted positions. Then the clamp unit 3 is lowered onto the clamp fixing unit 2 from above, and is set upon it as shown in FIG. 7. Next the hydraulic pressure in the hydraulic passage 65 is vented, in order to change over the clamping mechanisms 60 from their unclamped states to their clamped states, and as shown in FIG. 8 the hydraulic pressures in the unclamping hydraulic chambers 61a are vented, so that the piston members 62 are lowered and go into their clamped states due to the elastic force of the strong coned disk springs 64.

Although at this time the clamping mechanisms 60 go into their clamped states rapidly, since residual hydraulic pressures created due to the lowering operation of the piston members 62 are generated in the hydraulic passage 65 and in the hydraulic pressure operation chambers 89, accordingly the connection sleeves 84 are held in their retracted positions as shown in FIG. 8; and thereafter, when the hydraulic pressures in the hydraulic passage 65 and the hydraulic pressure operation chambers 89 decrease sufficiently, the connection sleeves 84 rise due to the elastic force of the springs 85, and the connecting barrel portions 84b of the connection sleeves 84 thrust themselves into the female couplers 82, so that the valves of the male couplers 81 and the valves of the female couplers 82 are opened, and the male couplers 81 and the female couplers 82 are put into their connected states as in the figure.

Due to the positioning mechanisms 40, the clamping mechanisms 60 are put into their clamped states with respect to the pallet main body 1 in the state in which the base plate 20 of the clamp unit 3 is accurately positioned in the vertical direction and in the horizontal direction, and in this state it becomes possible to insert the connection sleeves 84 of the fluid passage connection devices 30 into the female couplers 82 smoothly in order to connect the male and female couplers 81 and 82, since now the biasing force of the springs 85 is not a strong force, so that, while allowing the male and female couplers 81 and 82 to be made more compact, it is also possible to connect the male and female couplers 81 and 82 in a proper state without performing any vehement action, and thus it is possible to enhance the durability of the male and female couplers 81 and 82.

Since, when putting the clamping mechanisms 60 into their clamped states, the male and female couplers 81 and 82 are put into their connected state after the initial changeover to the clamped state, accordingly it is considered that damage to the male and female couplers 81 and 82 will be prevented, and so the durability can be enhanced. And since, when putting the clamping mechanisms 60 into their unclamped states, the connection sleeves 84 of the male couplers 81 are changed over to their retracted positions initially, and the clamping mechanisms 60 are put into their unclamped states after the separated states of the male and female couplers 81 and 82 have been established, accordingly it is considered that damage to the male and female couplers 81 and 82 will be prevented, and so the durability can be enhanced.

And, since the male and female couplers 81 and 82 are built so as to be connected together and to be separated in their states in which the fluid pressures interior to them and in the fluid passage 91 are vented, accordingly it is possible to anticipate that the springs in the male and female couplers 81 and 82 can be made more compact, in other words that the male and female couplers 81 and 82 can be made more compact; and moreover it is possible to anticipate that connection and separation of the male and female couplers 81 and 82 can be made more smooth.

Embodiment 2

Figure 10:
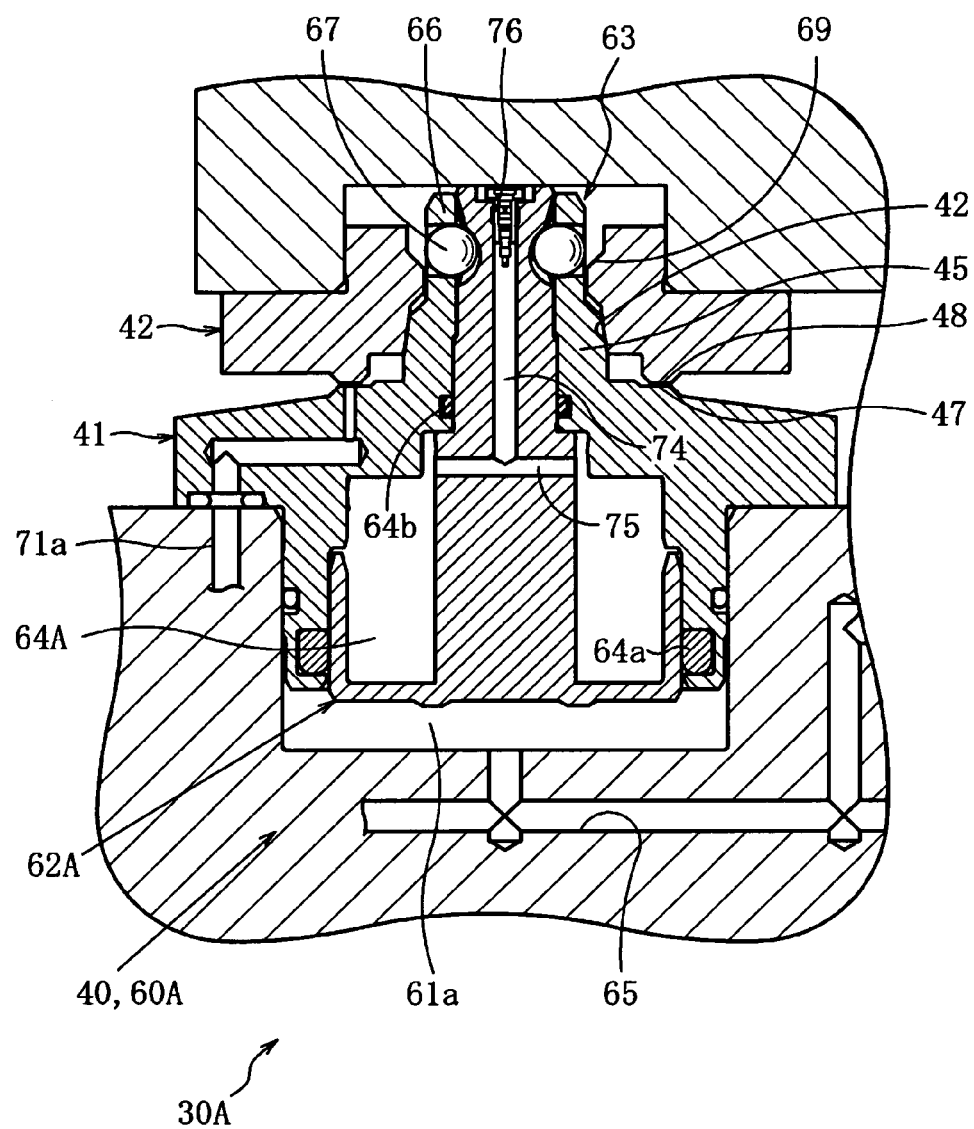
FIG. 10 is a drawing corresponding to FIG. 7 of a fluid passage connection device according to a second embodiment.

In the description of this embodiment, to structural elements that are similar to ones of the first embodiment, the same reference numerals are appended, and explanation thereof will be omitted, with only the structures that are different being explained. As shown in FIG. 10, with the clamping mechanism 60A of this fluid passage connection device 30A, it is arranged for its piston member 62A to be biased downwards by the elastic force of compressed nitrogen gas enclosed in an annular gas storage chamber 64A (for example at a gas pressure of around 7 to 10 MPa). In order to charge the compressed nitrogen gas into this gas storage chamber 64A, gas passages 74 and 75 are formed in the piston rod portion of the piston member 62A, and a charging valve 76 for charging the compressed nitrogen gas is installed at the upper end portion of this gas passage 74. The compressed nitrogen gas enclosed in the gas storage chamber 64A is sealed in by seal members 64a and 64b. With this clamping mechanism 60A, the structure is simplified, since it is possible to omit the superimposed layers of coned disk springs. This fluid passage connection device 30A operates in a similar manner to the fluid passage connection device 30 of the first embodiment, and provides similar advantages.

Embodiment 3

Figure 11:
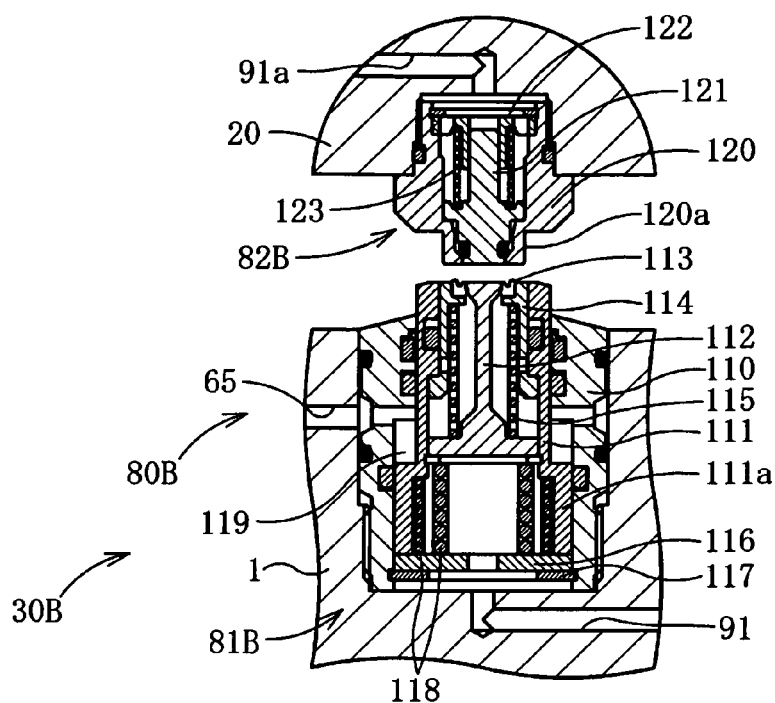
FIG. 11 is a vertical sectional view of a coupler mechanism according to a third embodiment (coupler separated state)
Figure 12:
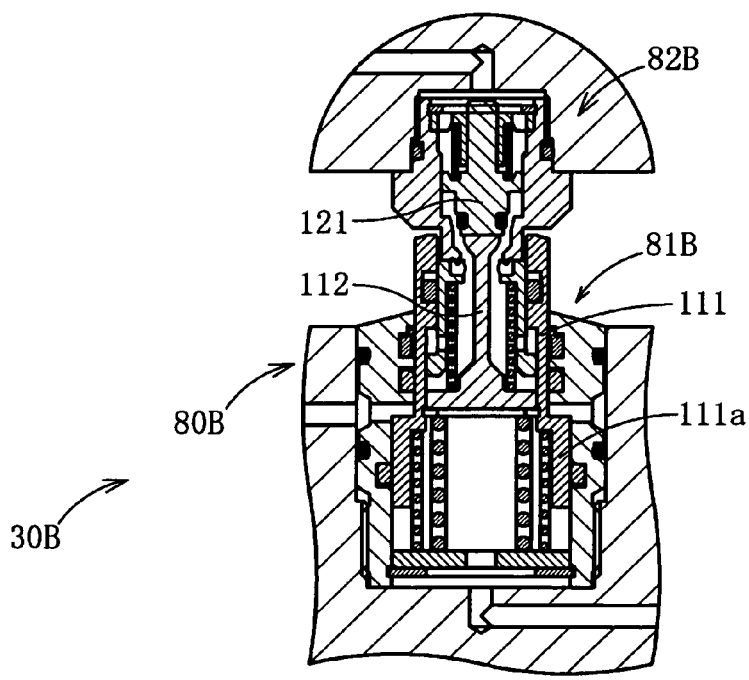
FIG. 12 is a vertical sectional view of the coupler mechanism according to the third embodiment (coupler connected state).

In the description of this embodiment, to structural elements that are similar to ones of the first embodiment, the same reference numerals are appended, and explanation thereof will be omitted, with only the structures that are different being explained. As shown in FIGS. 11 and 12, with the coupler mechanism 80B of this fluid passage connection device 30B, the female coupler 81B is attached to the pallet main body 1, while the male coupler 82B is attached to the base plate 20. The female coupler 81B corresponds to the "first coupler", while the male coupler 82B corresponds to the "second coupler" in the claims.

This female coupler 81B comprises a case 110, a connection sleeve 111 that is installed within the case 110 so as to be capable of rising and dropping therein (this corresponds to the "connection member"), a valve member 112 that is installed within the upper half portion of this connection sleeve so as not to be capable of shifting relatively thereto, a movable barrel member 114 that supports a seal member 113 at its upper end portion and that is installed between the valve member 112 and the connection sleeve 111 so as to be capable of rising and dropping therein, a spring 115 that biases the movable barrel member 114 upwards with respect to the valve member 112, a spring reception ring 116, a stop ring 117 that receives and stops the spring reception ring 116, a spring 118 that biases the connection sleeve 111 upwards with respect to the case 110, an annular hydraulic pressure operation chamber 119 that applies hydraulic pressure to the annular upper surface of a piston portion 111a of the connection sleeve 111, and so on. And the hydraulic pressure operation chamber 119 is connected to and communicates with the hydraulic passage 65 that supplies and vents hydraulic pressure to and from the above unclamping hydraulic chamber 61a of the hydraulic cylinder 61.

The male coupler 82B comprises a case 120, a movable valve member 121 that is installed within the case 110 so as to be capable of rising and dropping therein, a spring reception and guidance member 122 that is installed within the upper portion of the case 120, a spring 123 that is installed between this spring reception and guidance member 122 and the movable valve member 121 and biases the movable valve member 121 so as to close it, and so on. And a connecting barrel portion 120a is formed at the tip end portion of the case 120, and can be fitted into the upper end portion of the connection sleeve 111 of the female coupler 81B.

When hydraulic pressure is vented from the unclamping hydraulic chamber of the hydraulic cylinder of this clamping mechanism, since the hydraulic pressure in the hydraulic passage 65 drops and the hydraulic pressure in the hydraulic pressure operation chamber 119 also drops, accordingly, as shown in FIG. 12, the connection sleeve 111 rises and the female coupler 81B is connected to the male coupler 82B. This fluid passage connection device 30B operates in a similar manner to the fluid passage connection device 30 of the first embodiment, and provides similar advantages.

Variant examples in which the first, second, and third embodiments described above are partially changed will now be explained.

[1] As the clamp devices fitted to the clamp unit 3, it would be possible to employ hydraulic pressure driven type clamp devices or air driven type clamp devices of various types and structures, different from the above clamp device. And the fluid passage connection device 30 is not to be considered as being limited to connecting three different fluid passages; it would be acceptable for it to be a device that connects a single fluid passage, or one that connects three or more fluid passages.

[2] With the fluid passage connection devices 30, 30A, and 30B of the above embodiments, the positioning mechanisms 40 and the clamping mechanisms 60, 60A were built integrally, but it would also be acceptable to provide these as separate structures. And the provision of two positioning mechanisms 40 is not limitative; it would also be acceptable to provide one positioning mechanism, or three or more thereof. In a similar manner, the provision of two clamping mechanisms 60, 60A is not limitative; it would also be acceptable to provide one clamping mechanism, or three or more thereof.

[3] While in the above embodiment, by way of example, a case was explained in which the hydraulic clamp device 4A and the workpiece support member 5A with the air nozzle for seating detection attached were provided upon the base plate 20, the present invention is not limited to the devices that are provided upon the base plate 20 being only a clamp device and a workpiece support portion; it would also be acceptable for them to be various types of devices that require pressurized fluid such as pressurized hydraulic fluid or air or the like.

[4] The shown structures of the male and female couplers 81, 81B, 82, and 82B are only cited by way of example; couplers of various other structures having similar functions may also be employed.

[5] Apart from the above, for a person skilled in the art, it would be possible to implement the above embodiments in various forms by supplementing various changes, and the present invention is to be considered as also including this type of variant implementation.

INDUSTRIAL APPLICABILITY

The present invention can be applied to a fluid passage connection device that connects and separates a hydraulic passage that supplies and vents hydraulic pressure to and from a work pallet of a machining center.

The invention claimed is:

1. A fluid passage connection device comprising a first coupler fitted to a stationary base member and a second coupler that can be connected to the first coupler and that is fitted to a movable member, constituted so as to connect and separate a fluid passage through the first coupler and the second coupler, comprising:

a positioning mechanism for positioning the movable member with respect to the base member, so that it becomes possible for the first coupler and the second coupler to connect together; and a clamping mechanism that clamps the movable member with respect to the base member, with an elastic force of an elastic member or an enclosed compressed gas, and that releases this clamping with a fluid pressure of a fluid pressure cylinder;

the first coupler comprising a connection member that is provided so as to be shiftable in its axial direction and connects a fluid passage in an engaged state with the second coupler, a spring that elastically biases the connection member so as to project, and a fluid pressure operation chamber that applies a fluid pressure to drive the connection member so as to retract; and a fluid passage in the base member extending between the fluid pressure operation chamber of the first coupler and an unclamping fluid chamber of the fluid pressure cylinder of the clamping mechanism; and wherein said fluid passage applies fluid pressure supplied from a fluid pressure source contemporaneously and commonly to both of the fluid pressure operation chamber and the unclamping fluid chamber.

2. A fluid passage connection device according to claim 1, further characterized in that, when the clamping mechanism is in its unclamped state, fluid pressure is charged into the fluid pressure operation chamber of the first coupler and thereby the connection member is maintained in its retracted position.

3. A fluid passage connection device according to claim 1 wherein, when the fluid pressure in the unclamping fluid chamber is vented in order to change over the clamping mechanism from its unclamped state to its clamped state, the fluid pressure in the fluid pressure operation chamber is decreased after having changed over to the clamped state by the elastic force of the elastic member or the enclosed compressed gas, thereby the connection member is shifted in its projection direction, and the first coupler and the second coupler are connected together.

4. A fluid passage connection device according to claim 1 wherein, when fluid pressure is supplied to the unclamping fluid chamber in order to change over the clamping mechanism from its clamped state to its unclamped state, the unclamped state is established after the connection member has been changed over to its retracted position by the fluid pressure in the fluid pressure operation chamber.

5. A fluid passage connection device according to claim 1, further characterized in that the spring elastically biasing the connection member is a spring that generates an elastic force weaker than an elastic force of the elastic member or the enclosed compressed gas for clamping.

6. A fluid passage connection device comprising a first coupler fitted to a stationary base member and a second coupler that can be connected to the first coupler and that is fitted to a movable member, constituted so as to connect and separate a fluid passage through the first coupler and the second coupler, comprising:

a positioning mechanism for positioning the movable member with respect to the base member, so that it becomes possible for the first coupler and the second coupler to connect together; and a clamping mechanism that clamps the movable member with respect to the base member, with an elastic force of an elastic member or an enclosed compressed gas, and that releases this clamping with a fluid pressure of a fluid pressure cylinder;

the first coupler comprising a connection member that is provided so as to be shiftable in its axial direction and connects a fluid passage in an engaged state with the second coupler, a spring that elastically biases the connection member so as to project, and a fluid pressure operation chamber that applies a fluid pressure to drive the connection member so as to retract; and wherein a fluid passage is provided in the base member, making an unclamping fluid chamber of the fluid pressure cylinder communicate with the fluid pressure operation chamber; and further comprising:

an air nozzle for detecting seating and a fluid pressure type clamp device is provided to the movable member; and as the fluid passage that is connected and separated, there are provided two fluid pressure passages of two systems for the fluid pressure type clamp devices, and one air passage of one system for an air nozzle.

7. A fluid passage connection device according to claim 2 wherein, when the fluid pressure in the unclamping fluid chamber is vented in order to change over the clamping mechanism from its unclamped state to its clamped state, the fluid pressure in the fluid pressure operation chamber is decreased after having changed over to the clamped state by the elastic force of the elastic member or the enclosed compressed gas, thereby the connection member is shifted in its projection direction, and the first coupler and the second coupler are connected together.

8. A fluid passage connection device according to claim 2 wherein, when fluid pressure is supplied to the unclamping fluid chamber in order to change over the clamping mechanism from its clamped state to its unclamped state, the unclamped state is established after the connection member has been changed over to its retracted position by the fluid pressure in the fluid pressure operation chamber.

* * * * *